United States Patent [19]

Maitland et al.

[11] Patent Number: 4,899,362

[45] Date of Patent: Feb. 6, 1990

[54] METAL VAPOR LASER WITH IMPROVED LASER MEDIUM FORMATION

[75] Inventors: Arthur Maitland, St Andrews; Ewan S. Livingstone, Kinrose, both of Scotland

[73] Assignee: EEV Limited, Chelmsford Essex, United Kingdom

[21] Appl. No.: 279,645

[22] Filed: Dec. 5, 1988

[30] Foreign Application Priority Data

Dec. 4, 1987 [GB] United Kingdom ............... 8728422
Jan. 18, 1988 [GB] United Kingdom ............... 8801022
Jun. 6, 1988 [GB] United Kingdom ............... 8813347

[51] Int. Cl.$^4$ .............................................. H01S 3/22
[52] U.S. Cl. ........................................ 372/55; 372/56; 372/58; 372/60; 372/61; 372/77; 372/88
[58] Field of Search ................ 372/55, 56, 77, 85, 372/88, 87, 81, 61, 58, 60, 103, 36

[56] References Cited

U.S. PATENT DOCUMENTS 3,813,612  5/1974  Schriever et al. ................. 372/60
3,982,205  9/1976  Sutton et al. ..................... 372/55
4,584,689  4/1986  List et al. ......................... 372/60
4,787,091 11/1988  Wagner ............................. 372/55

FOREIGN PATENT DOCUMENTS 0129718  2/1978  Fed. Rep. of Germany ........ 372/56
0113491  6/1985  Japan ............................. 372/60

OTHER PUBLICATIONS

Aldridge; "Stimulated Emission . . . Iodine Photodissociation Laser"; IEEE J. of Quantum Electronics, 05/1975; pp. 215-217.

Primary Examiner—Frank Gonzalez
Attorney, Agent, or Firm—Spencer & Frank

[57] ABSTRACT

In a laser arrangement, solid or liquid material, at least part of which comprises a laser amplifying medium, is atomized in a gas prior to being applied to a discharge region. In one embodiment of the invention, the gas is combustible and is ignited to produce a flame which provides heating of the material. The invention is particularly applicable to metal vapour lasers.

In another embodiment of the invention, the material is atomized in an inert gas and a discharge within a laser discharge tube is used to provide excitation.

23 Claims, 4 Drawing Sheets

METAL VAPOR LASER WITH IMPROVED LASER MEDIUM FORMATION

FIELD OF THE INVENTION

This invention relates to laser arrangements and more particularly, but not exclusively, to metal vapour lasers.

BACKGROUND TO THE INVENTION

Presently known metal vapour lasers usually operate in gaseous electrical discharges at pressures below 1 bar. Metal, or a metallic compound, is contained in the laser discharge tube. The metal or metal compound is heated to a temperature at which the metal vapour pressure is sufficient to support laser action when the vapour is suitably pumped to establish a population inversion. One disadvantage of presently known metal vapour lasers is that the time required to achieve the operating temperature (termed the "warm-up" time) for laser action can be unacceptably long. Another disadvantage is that a laser tube containing free metal or a metallic compound cannot be moved, tilted or operated vertically without some provision being made to retain the solid or liquid in position along the tube.

SUMMARY OF THE INVENTION

The present invention aims to provide an improved laser arrangement in which the above disadvantages are reduced or eliminated.

According to the invention there is provided a laser arrangement in which solid or liquid material, at least part of which is to comprise a laser amplifying medium, is atomised and dispensed into a gas flow prior to being introduced to a discharge region. Atomisers are known devices in which a solution, or fine particles, is sprayed through a nozzle into the gas flow. As the particles or droplets are small, when they reach the discharge region only small amounts of additional energy are required to vaporise them and bring the laser amplifying medium to a state ready for lasing. The warm-up times necessary are correspondingly reduced.

The invention may be particularly advantageously employed if the laser amplifying medium is to be a metal vapour.

In one advantageous embodiment of the invention, gas in which the material is atomised is combustible and means are included to ignite the gas to produce a flame whereby the atomised material is vaporised. Thus, the flame can be "seeded" with atoms or molecules which are to form the laser amplifying medium. Further excitation may then be provided by an electrical discharge to obtain a population inversion. In one embodiment of the invention the material is methyl iodide, which preferably is atomised in a mixture of propane and oxygen. On combustion, an oxyiodine reaction occurs which results in laser radiation being generated in the infra-red part of the spectrum, at 1.3 μm.

The solid or liquid material may be applied to an atomiser to directly atomise it in the combustible gas, or it could be atomised in a non-combustible gas which is then mixed with another gas to obtain a combustible mixture. The laser action may be arranged to occur at atmospheric pressure, in which case no containing envelope is required, although it may be desirable in some circumstances to provide shielding of the flame from atmospheric disturbances. The combustible gas carrying atomised material may be arranged to pass through a burner where it is ignited. The burner may be made of metal, in which case it may act as an electrode in a discharge circuit arranged to produce a discharge in the flame. In an alternative arrangement, the burner may be made of ceramic. In one particularly advantageous configuration, the burner is elongate and has a passage along its length (a longitudinal passage) through which gas is arranged to flow and a plurality of apertures transverse to the longitudinal passage which connect it to the atmosphere surrounding the burner, with the length of the burner horizontal. A flame which is substantially uniform burns vertically along the length of the burner. It is preferred that an electrode of a discharge circuit is essentially parallel to the length of the burner so as to produce a uniform discharge in the flame.

Where the burner is of metal it may be arranged to act as the other electrode of the discharge circuit. Alternatively, the metallic burner may be electrically isolated from the two electrodes in the discharge circuit. If the burner is of ceramic, or another insulating material, another electrode parallel to the length of the burner must be provided.

In an alternative advantageous arrangement, laser action is arranged to occur at low pressure within an envelope. By "low pressure" it is meant that the pressure is sub-atmospheric, and it may be as low as a few torr. In such an arrangement, two electrodes may be positioned such that a discharge established between them in the flame causes longitudinal excitation of the amplifying medium. One of the electrodes may be annular and arranged to hold the base of the flame, that is, the flame may be arranged to originate at the electrode. Preferably, a tube is arranged to surround the flame within the envelope, as this is helpful in enabling a laminar flow of the flame to be established. This is desirable as it tends to reduce variations in refractive index along the length of the envelope. Advantageously, a mirror defining part of the laser resonant cavity has an aperture therethrough. This enables the flame to pass through the mirror.

In another arrangement in accordance with the invention, instead of using combustible gas and causing it to ignite, the gas in which the material is atomized is an inert gas. In such an arrangement it is preferred that laser action is arranged to occur within an envelope at low pressure. Such an arrangement is particularly advantageous where the material is a metal bromide, such as copper bromide, as such compounds may sublime.

BRIEF DESCRIPTION OF THE DRAWINGS

Some ways in which the invention may be performed are now described by way of example with reference to the accompanying drawings, in which.

DESCRIPTION OF PREFERRED EMBODIMENTS

Figure 1:
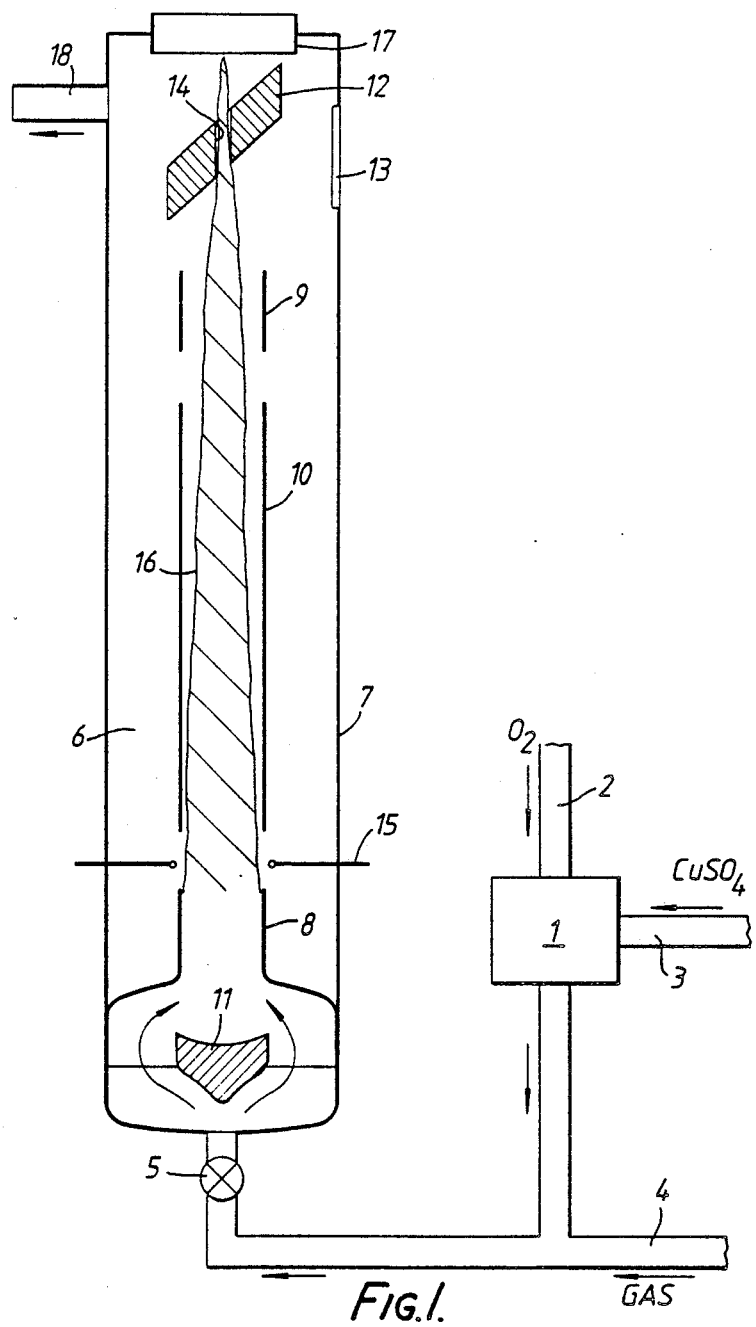
FIGS. 1 to 6 schematically illustrate different laser arrangements in accordance with the invention.

With reference to FIG. 1, a laser arrangement in accordance with the invention employs a combustible gas in which atomised copper sulphate solution is entrained. When the gas is ignited within an envelope, copper vapour is produced by dissociation of the sulphate molecules and is then excited to provide a population inversion in the copper atoms to generate laser radiation. The arrangement includes an atomizer 1 to which oxygen gas is applied via a pipe 2 and copper sulphate solution via a pipe 3. The atomiser 1 causes droplets of the copper sulphate solution to be injected into the oxygen so that they become suspended in it. The atomised solution in the gas is then mixed with natural gas flowing in a pipe 4 to give a combustible gas mixture which is then supplied via a regulator 5 to a laser discharge tube 6. The laser discharge tube 6 is arranged with its optical axis substantially vertical It comprises an envelope 7 within which are contained two annular electrodes 8 and 9 having a cylindrical quartz tube 10 located between them. The laser resonant cavity is defined by three mirrors 11, 12 and 13. The mirror 11 has a concave reflecting surface. The mirror 12 is a folding mirror which has a planar surface inclined to the optical axis and an aperture 14 passing through it along the optical axis. The mirror 13 is partially transmissive and is aligned with respect to the mirror 11 so as to form a resonant cavity via mirror 12.

The gas mixture carrying the suspended atomised copper sulphate solution is arranged to pass into the envelope via the regulator 5 and flow around the outside of the concave mirror 11. The gas is constrained to pass through the annular electrode 8 nearest the concave mirror 11 where a spark produced between electrodes 15 located near the electrode 8 ignites the gas. The flame 16 which results extends along the envelope 7 and is confined by the tube 10 and the second annular electrode 9, the base of the flame being held by the electrode 8. The end of the flame is arranged to pass through the aperture 14 in the planar mirror 12 and impinges on a water-cooled heat sink 17 located at the end of the envelope 7. As the atomized copper sulphate solution enters the flame, the solvent evaporates and the sulphate dissociates to yield the copper atoms required. When it is desired to produce laser radiation, a discharge is established between the electrodes 8 and 9, using a conventional laser discharge circuit, and the longitudinal excitation initiates laser action. Copper which condenses or which does not become vaporised as it travels along the discharge tube is carried by the flame through the aperture 14 and deposited on the heat sink 17.

An outlet 18 enables gas to be drawn out of the laser discharge tube 6 so that pressure within the envelope 7 may be controlled. The pressure must be maintained at a low value so that a glow discharge can be established within the laser discharge tube 6.

Figure 2:
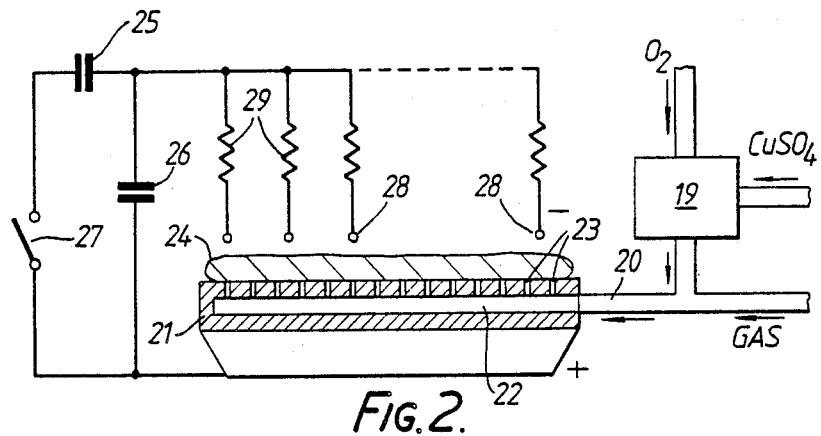

With reference to FIG. 2, in another laser arrangement, laser action is arranged to occur at atmospheric pressure. As in the arrangement shown in FIG. 1, copper sulphate solution is atomised in oxygen using an atomizer 19 and the resulting suspension is mixed with natural gas to form a combustible mixture in which the copper sulphate droplets are suspended. The combustible gas is applied via a pipe 20 to an elongate burner 21. The burner 21 is made of metal and has a passage 22 which is extensive along its length and a plurality of apertures 23 which connect the passage 22 with its external surroundings. It should be noted that the burner 21 is shown in cross-section for a clearer understanding of its configuration As the gas leaves the burner 21, it is ignited by a spark and the resulting flame 24 containing vaporised copper is produced along the length of the burner 21.

The burner 21 is arranged to act as an electrode in a laser discharge circuit. The circuit also comprises two capacitors 25 and 26, a thyratron switch 27 and a plurality of electrodes 28. The electrodes 28 are distributed along the length of the flame 24. Resistors 29 limit the current to the individual electrodes 28. When it is desired to initiate laser action within the flame 24, the capacitor 25 is charged and then the switch 27 is closed so that charge is transferred to the other capacitor 26. When the breakdown voltage between the electrodes 28 and the burner 21 is reached, discharges are established between them. The resistors 29 ensure that the discharges occur simultaneously and uniformly along the length of the flame 24. The copper vapour, excited by the discharge enables laser radiation to be generated.

Figure 3:
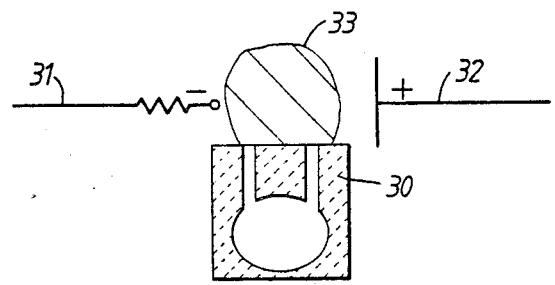

With reference to FIG. 3, in an alternative arrangement to that shown in FIG. 2, the burner 30 is made of ceramic material. A pair of electrodes 31 and 32 are located such that, when a flame 33 is present, it is located between them.

Figure 4:
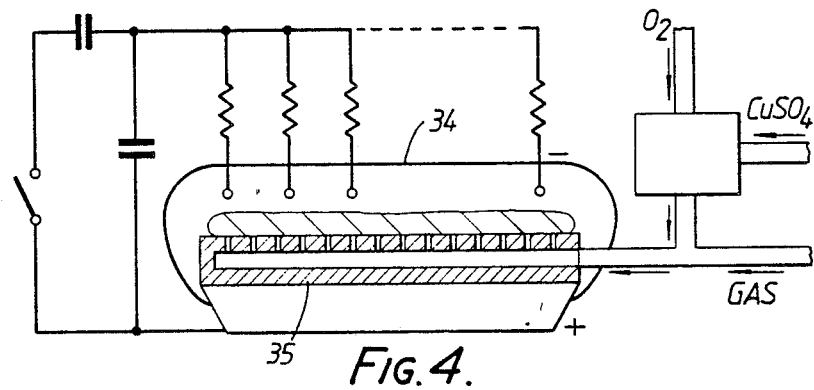

With reference to FIG. 4, another laser arrangement in accordance with the invention is similar to that illustrated in FIG. 2 but includes an envelope 34 within which the burner 35 is contained, and the laser operates at a few torr pressure.

Figure 5:
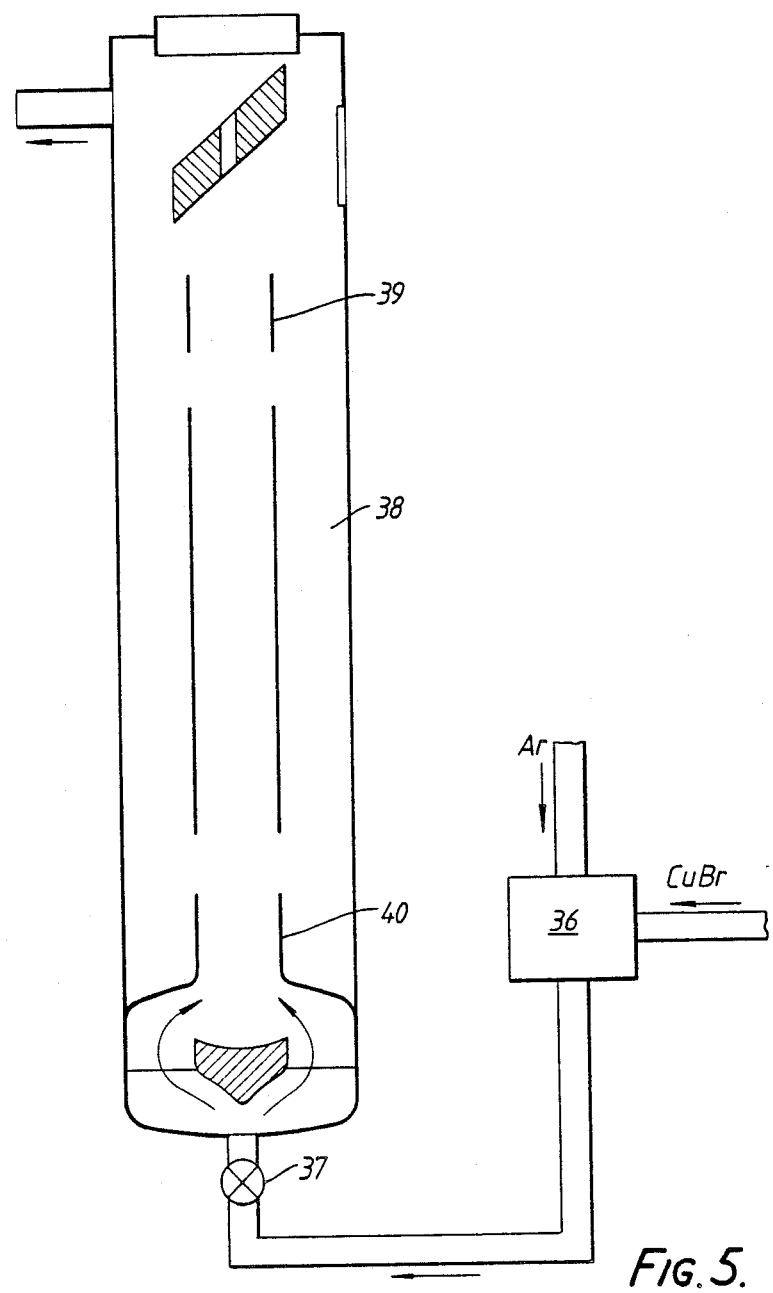

With reference to FIG. 5, in another laser arrangement in accordance with the invention, a solid material is atomised in an inert gas and then supplied to a laser discharge tube. Unlike the other illustrated arrangements, a flame is not used in this arrangement. The laser discharge tube is similar to that shown in FIG. 1, but electrodes 15 are omitted. During operation of the arrangement, fine copper bromide powder is entrained in argon gas in the mixer 36. The resulting suspension is supplied via a regulator 37 to the laser discharge tube 38. When it is wished to establish laser operation within the discharge tube 38, a discharge is established between two electrodes 39 and 40 within the discharge tube. The heat of the discharge causes the copper bromide to vaporise and to dissociate, with the formation of copper vapour. Further discharges between the electrodes 39 and 40 excite the copper vapour and enable laser action to be initiated.

Figure 6:
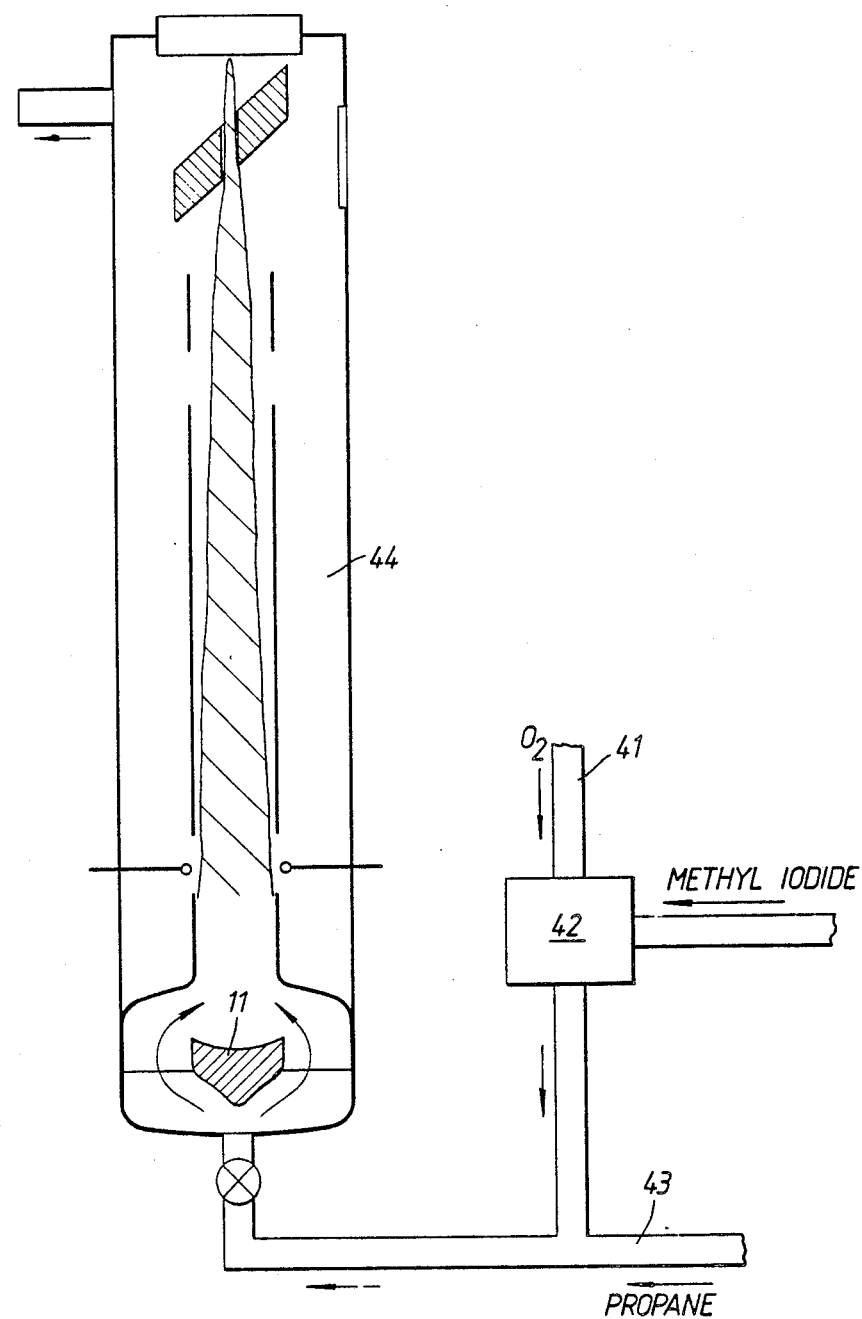

With reference to FIG. 6, a laser arrangement is similar to that illustrated in FIG. 1, but the material which is atomized is methyl iodide. This is mixed with an oxygen supply travelling along a pipe 41 at 42 and then combined with propane in pipe 43. When the mixture is ignited in the discharge tube 44, an oxy-iodine reaction occurs to give infra-red laser radiation.

We claim:

1. In a laser device including a laser discharge chamber; a first electrode, a second electrode and a discharge region within said chamber, said discharge region being disposed between said electrodes, the improvement comprising:

means for generating a supply of atomized solid or liquid material, at least part of the material forming a laser amplifying medium;

means for mixing the atomized material into a gas flow creating a gas and material mixture having droplets of the material suspended in the gas flow; and means for introducing the mixture into said discharge region.

2. The device as defined in claim 1 wherein the material includes a composition containing a metal for conversion to a laser amplifying medium containing a metal vapour.

3. The device as defined in claim 1 wherein said material includes methyl iodide.

4. An arrangement as claimed in claim 3 wherein said discharge chamber has an optical axis and said mixture includes propane and oxygen; said device further including;
   means for igniting the mixture within said region to produce a flame extending between said electrodes along said optical axis whereby said atomized material is vaporized.

5. The device as defined in claim 1, wherein said discharge chamber has an optical axis and the gas portion of the mixture is combustible and said device further comprises means for igniting the mixture within said discharge region to produce a flame extending between said electrodes along said optical axis, whereby said atomized material is vaporized.

6. The device as defined in claim 5 wherein said laser discharge chamber is maintained at substantially atmospheric pressure.

7. The device as defined in claim 5 wherein said igniting means includes a burner, said burner including a passage in fluid communication with said introducing means, through which the mixture is introduced into said discharge region.

8. The device as defined in claim 7 wherein said burner is made of metal.

9. The device as defined in claim 8 wherein the burner includes said first electrode.

10. The device as defined in claim 7 wherein said burner is made of electrically insulative material.

11. The device as defined in claim 7, wherein said burner is elongate in the direction of said optical axis, said passage extending in said elongate direction said burner having a longitudinal wall facing said discharge region, and a plurality of apertures formed along said longitudinal wall extending to said passage, the gas being supplied to said discharge region from said apertures.

12. The device as defined in claim 11, wherein said first electrode is elongated and coextensive with said burner.

13. The device as defined in claim 5 and including an envelope enclosing said discharge region and said electrodes.

14. The device as defined in claim 13, further including means for establishing sub-atmospheric pressure within said envelope.

15. The device as defined in claim 13 further including means for producing a discharge between said electrodes in the flame for causing longitudinal excitation of said amplifying medium.

16. The device as defined in claim 13 wherein said first electrode is annular and surrounds one end of the flame.

17. The device as defined in claim 13 further including a containment tube surrounding said discharge region for containing the flame.

18. The device as defined in claim 13, including a mirror mounted within said chamber, said mirror defining a boundary of a laser resonant cavity and having an aperture therethrough which said flame passes during operation of the laser.

19. The device as defined in claim 18 wherein said mirror has a planar reflective surface which is inclined with respect to the optical axis of the laser discharge chamber.

20. The device as defined in claim 1 wherein the gas is inert.

21. The device as defined in claim 20, including an envelope enclosing said discharge region and said electrodes.

22. The device as defined in claim 20, including a mirror mounted within said chamber, said mirror defining a boundary of a laser resonant cavity and having an aperture therethrough, through which said flame passes during operation of the laser.

23. The device as defined in claim 20 wherein the material includes a metallic compound.

* * * * *